Sept. 1, 1970     B. H. DWIGGINS     3,526,044
AUTOMOTIVE AIR CONDITIONING SIMULATION SYSTEM
Filed June 5, 1968     2 Sheets-Sheet 1

INVENTOR.
BOYCE H. DWIGGINS
BY Retherbridge, O'Neill & Aubel
ATTORNEYS.

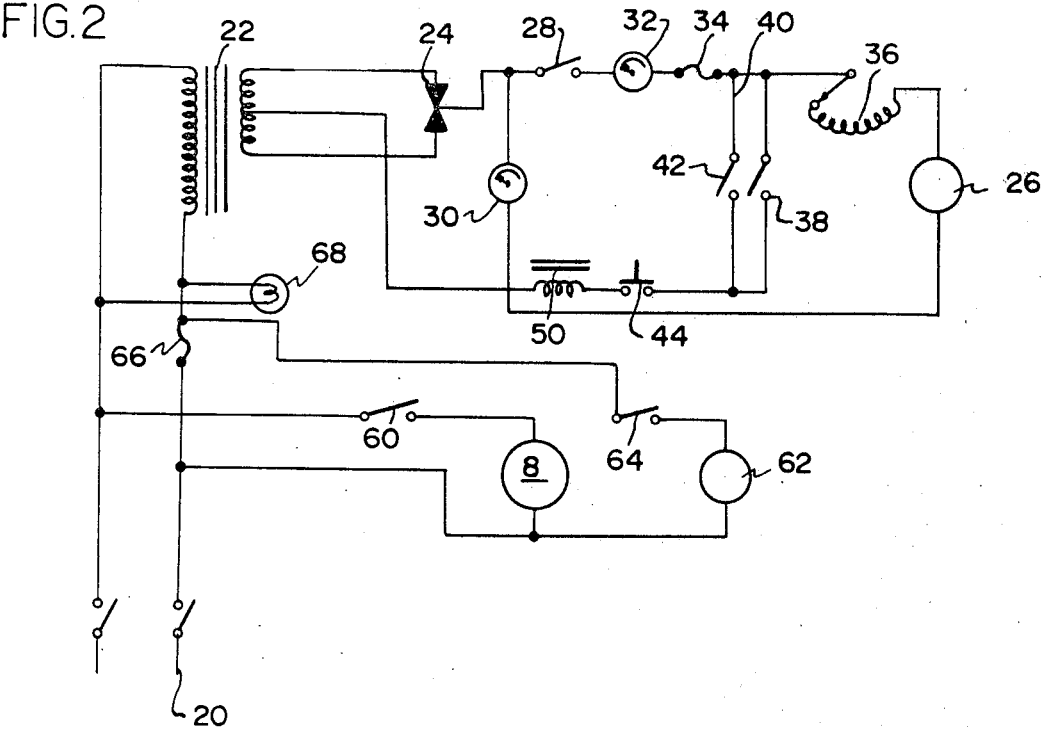

United States Patent Office 3,526,044
Patented Sept. 1, 1970

3,526,044
AUTOMOTIVE AIR CONDITIONING SIMULATION SYSTEM
Boyce H. Dwiggins, Hollywood, Fla., assignor to Automatic Sprinkler Corporation of America, Cleveland, Ohio, a corporation of Ohio
Filed June 5, 1968, Ser. No. 734,631
Int. Cl. G09b 25/02
U.S. Cl. 35—13                                  17 Claims

ABSTRACT OF THE DISCLOSURE

An automotive air conditioning system for simulating both normal and defective operation of a typical automobile air conditioning unit and various components thereof. The apparatus is scaled for portability and to be fully operated by commonly available electrical service through conventional outlets.

---

Figure 1:
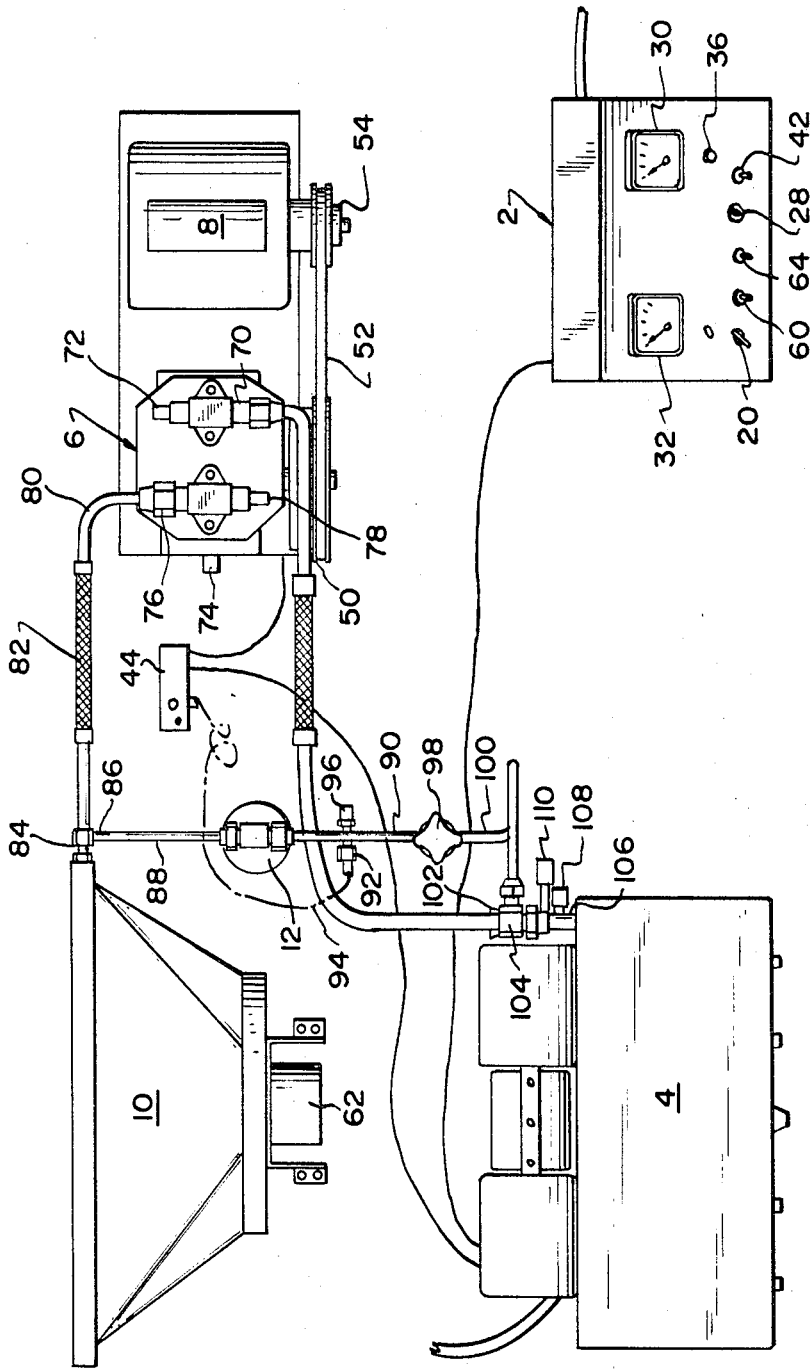

The teaching profession at all instructional levels has long been confronted with the problem of effectively developing the learning and creative thought processes of students. The basic and time-worn approach to education has been embodied in the lecture system primarily involving the imposition of the knowledge of the instructor onto the student. The conventional lecture approach or "force feeding" of a group of students by an instructor involves several acknowledged shortcomings. First, each of the students in a lecture group is carried at the instructional pace of the teacher with virtually no concessions made for individual students who are unable to grasp the subject matter at the teacher's pace and with no inducements made for the more rapid advancement of individual students capable of digesting material at a more rapid rate. Second, the lecture system does little to encourage learning or learning how to learn by individuals in the group. The knowledge of the instructor is directed to the students, as a group. This knowledge is imposed upon each student, absorbed or digested in part or fully by some and lost in full or in part by others. The long range result of the system is to essentially foster the mediocrity of the entire student group.

In the imposed knowledge approach to education, the use of visual aids is frequently employed to demonstrate various phenomena. These visual aids may take the form of rudimentary devices or sophisticated precision laboratory equipment. However, regardless of the nature of the aid used in teaching demonstrations, the individual student is permitted only to observe that which is demonstrated. He has virtually no opportunity to pursue personal inquiries or understanding of that which is being demonstrated. The student is, in effect, isolated from the full development of his mental processes in relation to the visual aid before him at his own rate and under his own mode of learning.

The basic shortcomings of the lecture system of education and the physical material used for demonstrative purposes in such systems have led applicant to the development of educational equipment which is designed not to serve primarily as a visual or teaching aid but is designed to serve as direct aids to learning. The automotive air conditioning system of the invention, therefore, is designed to help students, individually, to learn how to learn. The automotive air conditioning system of the invention will improve, simplify and accelerate the learning process of individual students in accordance with the ability of each to absorb the technology of automotive air conditioning. The system will also enable the individual student to utilize to the fullest, his undirected creative talents and ingenuity in dealing with automotive air conditioning systems and to apply the developed learning techniques in other fields of technology.

The automotive air conditioning system of the invention therefore is a learning apparatus. This apparatus utilizes a conventional evaporator unit of the type which would be installed in many automobile air conditioning systems. This evaporator includes a conventional thermostatic temperature sensing and control element. A switch in an electric control panel is used to control the operation of the evaporator blower motor independently of the thermostatic temperature control to permit a student to simulate both inoperative and operative conditions of the blower of the evaporator. The refrigerant fluid inlet and outlet of the evaporator are each provided with valved taps to which conventional pressure gauges can be affixed to enable a student to measure and observe inlet and outlet refrigerant pressures and to determine their relationships.

The evaporator outlet is connected through a tubular conduit to a compressor inlet fitting. The connecting conduit is provided with a braided vibration isolation tube which is designed to compensate for the pulsating effects of the refrigerant fluid being pumped through the system. The compressor inlet fitting is also provided with a valved tap or test fitting to which a conventional pressure gauge can be connected to ascertain compressor inlet pressures.

The compressor utilized can be any one of the commonly available automobile air conditioning compressors. This compressor, however, is adapted by providing a valve tap or test fitting in communication with the compressor fluid sump to permit the affixation of a pressure gauge to the test fitting for determination and observation of this fluid sump pressure. The compressor acts to compress the low pressure refrigerant fluid emanating from the evaporator to a high pressure and to discharge the high pressure refrigerant fluid from the compressor discharge fitting and into a fluid conduit which carries the high pressure refrigerant fluid to a condenser. The discharge fitting of the compressor is also provided with a supplementary valve tap or test fitting which permits the determination and observation by a conventional pressure gauge, of the pressure of the refrigerant fluid being discharged from the compressor. Also, the conduit carrying the refrigerant fluid from the compressor to the condenser is provided with a braided conduit which is designed to isolate the vibration or pulsation effects of the refrigerant fluid being pumped from the compressor.

The drive shaft of the compressor of the air conditioning system of the invention projects from the body of the compressor and is provided with a magnetic-centrifugal clutch which is driven through a belt drive system by an electric motor preferably of about three-quarter horsepower output. The compressor clutch is electromagnetically controlled both by the thermostat of the evaporator, which can cause engagement of the clutch to produce compressor output during evaporator demand periods, and by a pressure sensitive switch which is connected in communication with the refrigerant fluid flow system of the air conditioner and which will act to disengage the compressor clutch when a predetermined refrigerant fluid pressure is developed in the system.

The operation of the electric drive motor for the compressor is controlled through control panel of the system and a key lock switch thereon. The compressor motor is also controlled by a separate switch which permits the shutting off of the compressor motor to simulate a condition which would occur in an automobile when the fan belt of the engine was broken or began to slip.

The compressed refrigerant fluid is pumped by the compressor into a conventional condenser conduit grid wherein a fan or blower is utilized to pass air over the grid system to produce the cooling of the compressed refrigerant fluid in the condenser unit. The air conditioning system of the invention is constructed in a manner such that the condenser fan can be separately controlled from a control panel and can be selectively shut off for observation and determination of the effect of the inoperability of the condenser fan on an automobile air conditioning system.

The refrigerant fluid is pumped from the condenser unit through a conduit into a receiver-drier element which can be one of those presently available on the market for automobile air conditioning systems. The refrigerant fluid is dehydrated in the drier element and passes therefrom into a conduit in an essentially liquid form to the evaporator inlet. Once in the evaporator, the cooling effect of the liquified refrigerant fluid is produced as the fluid absorbs heat from the atmosphere directed to the evaporator coils by the evaporator blower.

A manually controllable valve is provided in the refrigerant flow path between the receiver-drier and the evaporator to permit a student to starve the evaporator of refrigerant fluid or to produce flooding of the compressor apparatus to simulate various inoperative or defective conditions of an automobile air conditioning system.

The system of the invention is designed to utilize the output power of a three-quarter horsepower electric motor to produce compressor revolutions equivalent to the 500–550 r.p.m.'s produced by the idling engine of an automobile. The air conditioning system of the invention can utilize readily available 110 volt A.C. current from a 20 amp. service outlet. A transformer and rectifier are used in the electrical system to convert the A.C. current to essentially 12 volt D.C. current for operation of the evaporator blower motor and the magnetic clutch.

Further, a thermostatic by-pass is provided in the system to permit by-passing of the evaporator thermostat to produce or simulate a defective thermostat condition to enable a student to appreciate the problems with which he would be confronted with defective evaporated thermostats.

The automobile automotive air conditioning system of the invention therefore permits the simulation by a student of a considerable number of conditions which might occur in a defective or inoperable automobile air conditioning system to aid him to learn through personal experience and observation how these conditions will appear in practice so that he may readily handle problems of this nature which he might be confronted with.

Various other objects and advantages of the invention will become more fully apparent from the following description and drawings illustrating presently preferred embodiments thereof and wherein.

FIG. 1 is a schematic illustration of the automotive air conditioning simulation system of the invention; and FIG. 2 is a schematic electrical diagram of the system of the invention.

Referring now to the drawings, and particularly FIG. 1, the elements of the automotive air conditioning simulation system of the invention generally consist of a control panel 2, an evaporator unit 4, a compressor, generally designated 6, an electric motor 8, a refrigerant condenser 10, and a receiver-drier unit, generally indicated 12. The system of the invention is designed to be secured to a bread-board type base which is of a size sufficient to make the unit readily portable for movement to virtually any desired location.

The automotive air conditioning simulation system of the invention is controlled by a key-lock switch 20, shown in both FIGS. 1 and 2. This switch 20, and thereby the system, is adapted to receive 115 volt A.C. current from any conventional electrical outlet capable of handling 20 ampere service. The operation of the system of the invention at essentially household voltages and currents makes it possible to realize the full benefits of the portability of the unit comprising the system since the unit can be utilized in classrooms, workshops, auditoriums, etc. This can only be made possible by operation at lower voltages and currents, thereby obviating the necessity of any special electrical circuits to permit the use of the apparatus embodying the air conditioning simulation system.

When the key-lock switch 20 is closed and the system is activated, current is transmitted to the evaporator 4 through a transformer 22, shown in FIG. 2, which convert the A.C. current to D.C. current, and through rectifier 24 to develop and transmit a 12 volt D.C. current to the evaporator unit 4, as illustrated in FIG. 2. The evaporator is a conventional unit of a type which would be commonly employed in any of the automobile air conditioning units presently available on the market. As is shown in FIG. 2, the blower motor 26 of the evaporator 4 can be controlled by a D.C. switch 28, shown on control panel 2 in FIG. 1. When D.C. switch 28 is in closed position, the voltage of the D.C. system is measured by and can be observed on volt meter 30 and the current draw on ammeter 32. In addition to switch 28, the D.C. system is protected by a 20 amp fuse 34 located adjacent ammeter 32. An evaporator blower motor speed control 36 is employed to permit the selective variation of blower motor output.

The operation of the evaporator blower motor 26 is primarily controlled by a conventional capillary tube thermostat (not shown) which automatically operates a thermostat switch 38 that selectively turns the evaporator blower motor off or on. A by-pass circuit 40 is provided to permit the selective by-passing of the automatic operation of the thermostatically controlled switch 38 and thereby the operation of evaporator blower motor 26. This by-pass circuit 40 is controlled by a by-pass switch 42, shown in FIGS. 1 and 2, to permit selective and predetermined by-passing of the thermostat of the evaporator to simulate its defective operation.

Referring again to the schematic electrical diagram of FIG. 2, it can be seen that a safety switch is provided as a protective control for the operation of the D.C. circuit of the evaporator blower motor. This switch 44 is normally closed but is controlled by the pressure of the refrigerant fluid in the air conditioning system of the invention to open when the pressure of the system reaches a predetermined level. The pressure switch by opening the D.C. circuit disengages a magnetic clutch 50 connected to the power input shaft of the compressor 6. The clutch may be either of the two types commonly used in the automobile air conditioning field, namely, the stationary field or the rotating field clutch. The clutch is connected to the power input or drive shaft of the compressor 6; and when the field thereof is energized by the D.C. circuit, a drive belt 52 (shown in FIG. 1) connected between the clutch 50 and the output shaft 54 of electric motor 8 drives the compressor power input at a predetermined rate which is designed to simulate the 500–550 r.p.m. idling speed of an automobile. When the pressure being developed in the refrigerant fluid system of the air conditioning simulator reaches a predetermined level, the high pressure switch 44 automatically opens and de-energizes the field of the magnetic clutch whereby the clutch is disengaged from driving relationship with respect to the drive shaft of the compressor 6 and additional pumping pressure development in the system is curtailed.

When key-lock switch 20 is closed and the air conditioning simulation system of the invention is energized, the manually controllable electric motor switch 60, shown in both FIGS. 1 and 2, is normally closed and the three-quarter horsepower compressor motor of the system is in driving operation. Also, an A.C. operated condenser fan, generally indicated 62, is driven when condenser fan control switch 64 is in closed condition. The A.C. circuit, through which both the three-quarter horsepower compressor motor 8 and the condenser fan 62 are operated, is protected by a 10 amp fuse 66. The circuit also includes an indicator light 68 to indicate when the key-lock switch 20 has been closed that the system is energized.

When the compressor, which is preferably a conventional reciprocating piston-type unit, is driven by motor 8 through belt 52 and clutch 50, the piston of the compressor (not shown) serves both to pump refrigerant fluid through the air conditioning system and to increase the pressure of the refrigerant fluid being discharged therefrom. As is shown in FIG. 1, the compressor, generally designated 6, includes an inlet valve 70 through which refrigerant fluid is introduced into the piston chamber of the compressor. This inlet valve is provided with a valve tap or test fitting 72 to which a conventional pressure gauge may be connected for purposes of observation and determination of inlet compressor pressures. The conventional compressor used in the air conditioning simulation system of the invention is modified by providing a valve tap or test fitting 74 which is connected in communication with the fluid sump of the compressor under the piston head thereof to permit observation and determination of sump pressure. The refrigerant fluid which is drawn into the compressor through inlet valve 70 is forced therefrom by the piston of the compressor through outlet valve 76. Again, to permit observation and determination of the refrigerant fluid pressures on the outlet side of the compressor 6, a valve tap or test fitting 78 is connected to the outlet valve 76. A conventional pressure gauge can be readily connected to valve tap 78 and the pressure on the outlet side of the compressor can be determined.

Refrigerant fluid is pumped by the compressor through a conduit 80 into a braided vibration isolation conduit 82 which is designed to protect the system from the results of the vibration produced by the pulsation of the refrigerant fluid passing through the conduit. The refrigerant fluid is directed through the braided conduit 82 into the inlet 83 of condenser unit 10. As in conventional automobile air conditioning systems, the condenser 10 is designed to convert the high pressure refrigerant fluid to its liquid form prior to its discharge therefrom. The condenser unit, as in the case of conventional condensers, consists of a number of coils of refrigerant fluid conduit to which are connected a plurality of heat exchange plates (not shown). The condenser fan 62 is used in conjunction with the heat exchange plates and condenser coils to force air over the plates and conduit coils and to remove heat therefrom.

The refrigerant fluid of the system, now in liquid form as the result of passage through the condenser 10, is discharged from the condenser through outlet 86 and is carried by conduit 88 to the receiver-drier or dehydrator 12. Since the load on the evaporator unit 4 may vary because of added heat or humidity and a loss of refrigerant which may occur through small leaks in the fluid system, the receiver-dried serves as a reservoir where a quantity of extra refrigerant is stored until required by a depletion in the refrigerant fluid content of the system. While the receiver portion of this commonly available unit is designed to insure that sufficient liquid refrigerant will be available for the evaporator at all times, the drier portion of the unit, which generally includes a dessicant of silica-gel, will aid in the removal of undesired moisture which may have accumulated in the refrigerant fluid. The receiver-drier 12, ordinarily, is also provided with a filter placed in the refrigerant flow path to remove dirt or other solids which may have been accidentally introduced into the refrigerant fluid system.

The dehydrated refrigerant fluid is discharged from the receiver-drier unit 12 through conduit 90. A tap 92 is connected in pressure communication with the refrigerant fluid carried by conduit 90. This tap 92 serves to connect pressure safety switch 44 through tube 94 with the refrigerant fluid pressure of the system. When the pressure in the system reaches a predetermined level, and preferably not in excess of 250 p.s.i., the switch 44 is actuated in a well known manner and opens with a resultant de-energization of the field of magnetic clutch 50 whereby operation of the compressor piston is halted. A test fitting 96 is connected with tap 92 to enable a student to apply a standard pressure testing guage to the refrigerant fluid system adjacent the pressure tap for safety switch 44 so that he may proceed to observe the pressure existing at this point in the system.

Conduit 90 serves to carry refrigerant fluid from the receiver-drier 12 to a manually operable shut-off valve 98 which can be used to open the refrigerant flow line completely, to close it partially, or to close it entirely thereby controlling the volume of fluid permitted to enter the evaporator 4 even in the event of replenishment of lost refrigerant by the receiver-drier 12.

Refrigerant fluid flow is carried past shut-off valve 98 through conduit 100 which carries the liquid refrigerant into the evaporator 4 through a thermostatically controlled expansion valve 102, also of conventional construction and not shown in detail. This valve is a precision device located at the inlet 104 of the evaporator unit 4 to regulate the flow of liquid refrigerant into the evaporator and to control the output thereof. The valve acts to thermostatically sense the temperature of the refrigerant fluid leaving the evaporator through outlet 106 through a remotely disposed bulb. Pressure within this bulb is regulated by the temperature of the refrigerant fluid passing through outlet 106. This pressure is transmitted through a capillary tube which actuates the valve, generally through a diaphragm actuator (not shown) which controls the volume of flow of refrigerant entering the evaporator in accordance with a predetermined system output.

The evaporator unit 4 consists of a series of conduit coils connected to inlet 104 and a series of heat exchange plates connected to the conduit (not shown). As in the case of the condenser 10, a blower 26, shown in FIG. 2, is utilized to force air over the conduit coils and the heat exchange plates. In this instance, however, heat is absorbed by the plates and the air passing thereover is cooled producing the cooling effect of the air conditioner. For test and observation purposes, both the evaporator inlet 104 and outlet 106 are provided respectively with test fittings 108 and 110 to permit student observation and determination of inlet and outlet pressures as well as their differential values.

The basic elements of the air conditioning simulation system of the invention have been discussed above in general terms with respect to the function thereof and have been illustrated in the drawings without great detail since elements such as the evaporator 4, the compressor 6, the electric motor 8, the refrigerant condenser 10, and the receiver-drier 12 are commonly available air conditioning components which form no part of the invention by themselves, except as indicated in the specification. Therefore, for purposes of simplicity and ease of understanding, specific structural details of the common elements of an automotive air conditioning system have been omitted.

Since the system of the invention and its components are capable of being assembled to a relatively compact breadboard type base, as illustrated in FIG. 1, great portability of the system can be achieved without the sacrifice of accessibility to the system components for study, observation and testing. Further, since the system is preferably designed to be operated by 115 volt, single-phase, 60-cycle alternating current, the power cord for connecting the system to an electrical outlet can be plugged in almost any available wall socket in a classroom, laboratory, auditorium, etc.

The apparatus of the system is not designed to be a precision instrument for determining precise operating values of the elements of the system although a reasonable degree of accuracy consistent with that found in most automobile air conditioning systems is produced. The primary goal of the system of the invention, however, is to provide a really portable system which can be relatively inexpensively produced and sold for wide educational distribution and yet is capable of simulating an almost infinite variety of actual automotive air conditioning functions and dis-functions.

Basically, the system of the invention is a learning system which provides a means for permitting an individual student or group of students to deal with essentially an operative automatic air conditioning system and to simulate correct and defective operation of the system and components thereof. The students' use of the system can be initially directed but can be subsequently used by the student to develop his own experimental techniques and to utilize his undirected ingenuity to the fullest.

The system has been designed to be as electrically and mechanically safe as practicable while being consistent with conditions which students would encounter in dealing with actual automobile air conditioning systems. Actuation of the system is controlled by the key-lock switch 20 which prevents undesired use of the system unless a key is furnished to actuate the switch 20. A 20 amp fuse 34 is provided in the D.C. circuit of the evaporator blower motor 26 and the magnetic clutch 50 to prevent damage to this circuit or its components due to current overloads. A second 10 amp fuse 66 is interposed in the A.C. circuit to protect the condenser fan motor 62 and electric motor 8 from current overloads. Also, the manually operable electric motor switch 60 is made to include a 15 amp automatic circuit breaker to serve as additional overload protection for motor 8. Finally, pressure sensitive switch 44 is connected to the refrigerant fluid flow circuit of the system to automatically cut fluid pumping from the compressor when the pressure in the system reaches a predetermined level, and preferably not above 250 p.s.i. Condenser fan and belt drive shrouds can be used to shield the condenser fan 62 and the drive belt 52 to avoid potential student injury although such devices tend to depart somewhat from conditions which would be encountered in actual automotive practice.

After the system has been connected to an electrical outlet and the key-lock switch 20 is turned "on," the electric motor 8, preferably a three-quarter horsepower motor which is capable of operating at 115 volt A.C. current and of generating a compressor speed which will simulate and be equivalent to the 500–550 r.p.m. engine idling speed of an automobile, is energized. The selectively operable thermostat of the evaporator 4 will initially control the proper operation of the system through thermostatic expansion valve 102. Under the proper or normal operation of the air conditioning simulation system of the invention, the electric motor 8 drives belt 52 through its output shaft 54 and with the cooperation of magnetic clutch 50 will drive the compressor to pump refrigerant fluid through the condenser 10, the receiver-drier 12, the evaporator 4, and return the exhausted refrigerant fluid to the compressor. While this normal operation of the system is taking place, a student may use a conventional pressure gauge to read input and output pressures of the refrigerant fluid at the evaporator through test fittings 108 and 110. He can read and observe the fluid pressure in the system downstream from the receiver-drier 12 through test fitting 96. He can use a pressure gauge to determine the lower refrigerant pressure of the fluid entering the compressor inlet valve 70 by attaching the pressure gauge to the valve tap or test fitting 72. He can relate the inlet compressor pressure to the higher outlet pressure by connecting the pressure guage to the valve tap or test fitting 78 adjacent the outlet valve 76 of the compressor. He can determine the sump pressure of the compressor by connecting his pressure gauge to the valve tap 74 communicating with the fluid sump of the compressor. The readings obtained from these pressure checkpoints can be recorded to establish operative standards for a normally operating system which can then be compared with results produced under conditions of simulated defective operation.

After the student or students have had an opportunity to observe a normally operating air conditioning system, experiments can be carried out utilizing the system of the invention in virtually limitless combinations to simulate various malfunctions or defects. For example, to determine the effect of the breakdown or malfunction of the electric compressor motor 8, which would be equivalent to a slipping or broken fan belt to an automobile, the manually operable electric motor switch 60 located on the control panel 2 can be moved to the "off" position. When electric motor 8 is shut-off, the compressor 6 ceases the pumping of refrigerant fluid, which is preferably one of the dichlorodifluoromethane refrigerants. Pressure checks can be made throughout the air conditioning system utilizing the available test fittings to determine the pressure conditions of the system when the compressor 6 is rendered inoperative.

Another test or simulation which can be conducted with the system can be accomplished by turning condenser fan control switch 64 to the "off" position to disable the condenser fan 62. Here, with the motor 8 and the compressor 6 in normal operation, refrigerant fluid is being pumped through the system at a normal operative flow rate. However, since the condenser fan 62 has been rendered inoperative, the condensation of the high pressure refrigerant fluid to a liquid from its gaseous phase will be incomplete. As a result of this, the efficiency of the evaporator 4 will tend to deteriorate and the thermostatic control thereof will place a heavier demand on the compressor and other components of the system. Comparative pressure checks can be made throughout the air conditioning system to evaluate the results produced by this simulated breakdown or defective operation of the condenser fan 62. Similarly, utilizing the speed control 36 of the evaporator blower motor 26, the exhaust from the evaporator unit 4 can be diminished to produce observable affects.

While in a normally operating automotive air conditioning system, a capillary tube thermostat and switch 38 will normally control the operation of the evaporator blower motor 26, the system of the invention provides a by-pass switch 42 wherein the capillary tube thermostat and switch 38 can be by-passed in the D.C. circuit to simulate a condition in the system of thermostat failure. This known condition can then be observed in relation to the results it produces on the balance of the air conditioning system. Also, by utilizing thermostat by-pass switch 42 to by-pass the thermostatic control of the evaporator 4, the evaporator can be made to act in the nature of a refrigeration unit capable of producing sub-zero temperatures when the by-pass 42 is maintained in closed position for a period of time.

The on-off switch 28 and the 12 volt D.C. electrical system, can be moved to the "off" position to deactivate both the evaporator blower motor 26 and the magnetic clutch 50. In such an instance, the compressor motor 8 and the condenser fan motor 62 would continue to operate even though the remainder of the system would remain essentially static. The de-activation of the D.C. circuit would be reflected by both the volt meter 30 and the ammeter 32. Various pressure tests could be conducted to determine and evaluate system conditions under the simulated breakdown of the direct current electric circuit.

Utilizing the manually operable shut-off valve 98, a student can proceed to partially close this valve to starve the evaporator 4, depriving it of its normal operative volume of refrigerant fluids. Of course, the starvation of the evaporator 4 by constricting and reducing refrigerant fluid flow through conduit 90 will tend to result in the production of an increased pressure upstream from the valve 98. This can be immediately observed by connecting a pressure gauge to test fitting 96 prior to partial closure of valve 98. The complete closure of valve 98 could result in a simulation of back-up or flooding conditions in the compressor. These could also be observed through pressure measurements throughout the system.

It is evident from the above discussion that simulated component breakdowns can be produced individually or in almost innumerable combinations. The student is thereby enabled to use the air conditioning simulation system of the invention to develop an almost total comprehension of the function of each of the elements of the system. Through his own experiments and observations and comprehension of the operation and function of the elements of an air conditioning system, the student will be able to quickly isolate the defective elements of an actual automobile air conditioning unit and make necessary repairs or replace defective parts.

Various modes of carrying out the invention are contemplated as being within the scope of the following claims particularly pointing out and distinctly claiming the subject matter which is regarded as the invention.

I claim:

1. An automotive air conditioning simulation system for learning purposes comprising: an evaporator assembly including evaporator blower means, refrigerant evaporator means having an inlet passage and an outlet passage, thermostatic control means to control the temperature of the refrigerant evaporator means, thermostat by-pass means for by-passing the thermostatic control means to permit simulation of defective thermostat conditions, shut-off means for selectively stopping the evaporator blower means to permit simulation of defective blower conditions, the outlet passage of the refrigerant evaporator means being connected in fluid communication with the inlet of a fluid compressor for compressing exhausted refrigerant fluid discharged from the evaporator assembly; the compressor including inlet means connected in connection with the outlet of the refrigerant evaporator means, fluid compressing means, discharge means for discharging compressed refrigerant fluid from the compressor, drive means for driving the compressor, selectively operable compressor drive control means for controlling the operation of the compressor drive means to permit selective simulation of compressor inoperability, the discharge means of the compressor being connected in fluid communication with the inlet means of a refrigerant fluid condenser means for condensing the fluid being discharged from the compressor; the condenser means including heat dissipation means for assisting in reducing the heat of the refrigerant fluid delivered thereto, condenser blower means to continuously move air over the heat dissipation means, selectively operable control means for shutting off the condenser blower means to selectively simulate the inoperability thereof, condenser outlet means connected in fluid communication with the inlet passage of the refrigerant evaporator means to return refrigerant fluid thereto; and selectively operable control means for controlling the operation of the air conditioning simulation system.

2. The automotive air conditioning system of claim 1 wherein refrigerant fluid flow control means are connected adjacent one of the refrigerant evaporator passages to permit selective regulation of the flow of refrigerant fluid to and from the evaporator assembly.

3. The automotive air conditioning system of claim 1 wherein means are provided for delivering D.C. current to the evaporator blower means to effect operation thereof and overload protection means are provided in the D.C. current circuit to break the circuit at predetermined current levels.

4. The automotive air conditioning system of claim 1 wherein pressure sensitive switch means are provided between the compressor and the evaporator assembly to break the D.C. current circuit when a predetermined fluid pressure is developed in the system.

5. The automotive air conditioning system of claim 1 including means connected across the refrigerant evaporator inlet and outlet passages for the demonstrative determination of refrigerant fluid pressure drop across the evaporator means.

6. The automotive air conditioning system of claim 1 wherein means are connected in fluid communication with the compressor for demonstratively determining operating fluid pressures of the compressor.

7. The automotive air conditioning system of claim 6, wherein the means for determining the compressor operating fluid pressures include means connected to the compressor inlet means to permit determination of inlet fluid pressure, means connected to the compressor discharge means to permit determination of fluid discharge pressures, and means connected to the fluid compressing means of the compressor to permit a determination of internal compressor fluid pressures.

8. The automotive air conditioning system of claim 1 wherein the selectively operable control means for controlling the operation of the air conditioning system includes a switch operated electrical circuit wherein separate switches are provided to separately and independently control the operation of the thermostat by-passing means, the condenser blower, the compressor drive means, and a circuit provided for delivering D.C. current to operative elements of the system.

9. The automotive air conditioning system of claim 8 wherein the selectively operable control means include a key lock over-ride switch to activate or deactivate the entire system.

10. The automotive air conditioning system of claim 1 wherein the compressor is provided with an actuator means, a magnetic-centrifugal clutch is operatively connected to the compressor actuator and means are provided for connecting the compressor drive means to the clutch in driving relationship, means are disposed between the condenser and the refrigerant evaporator means and in communication with the refrigerant therebetween for sensing the pressure of the fluid and for controlling the operation of the clutch and thereby the compressor.

11. The automotive air conditionnig system of claim 10 wherein means are connected in fluid communication with the fluid pressure sensing means for demonstratively determining the refrigerant fluid pressure acting thereon.

12. The automotive air conditioning system of claim 1 wherein the system is portable, the compressor drive means includes a three-quarter horsepower motor and the electrical circuit of the simulator draws under 20 amperes of current and can be connected to an ordinary electrical receptacle.

13. The automotive air conditioning system of claim 12 wherein the source of current is alternating current and transformer and rectifier means are provided to convert the alternating current to direct current at about 12 volts for the operation of components of the system.

14. The auomotive air conditioning system of claim 1 wherein a refrigerant fluid drier is connected in communication with the fluid refrigerant between the condenser outlet means and the evaporator inlet passage.

15. The automotive air conditioning system of claim 1 wherein vibration isolation means are connected between the evaporator and compressor and compressor and condenser of the system.

16. The automotive air conditioning system of claim 1 wherein the compressor drive means and the compressor are cooperatively connected to simulate the operation of an automotive air conditioning simulator at a curb engine idle speed of about 500 to 550 revolutions per minute.

17. An automotive air conditioning simulator for instructional purposes comprising: an evaporator assembly including blower means, blower control means for regulating air flow produced by the blower means in relation to the refrigerant evaporator means, refrigerant evaporator means having an inlet and an outlet, flow control means connected adjacent the inlet of the evaporator means to regulate the volume of refrigerant fluid entering the evaporator inlet, thermostat means for permitting predetermination of the operating temperature of the refrigerant evaporator means, thermostat conrol means to permit selective variation of the operating temperature of the refrigerant evaporator means, thermostat by-pass means for by-passing the thermostat means and control means for simulating defective thermostat conditions in the evaporator assembly, means for delivering operating power to the evaporator assembly, overload protection means to stop power delivery to the evaporator assembly at a predetermined operating pressure level, power shut-off means for selectively stopping power delivery to the evaporator assembly, means connected across the refrigerant evaporator inlet and outlet means to permit determination of pressure drop across evaporator means, the outlet of the refrigerant evaporator means being connected in fluid communication with the inlet of a refrigerant fluid compressor for compressing exhausted refrigerant fluid discharged from the evaporator assembly; the compressor including refrigerant fluid inlet means, fluid compressing means, discharge means for discharging compressed refrigerant fluid, means connected in fluid communication with the compressor to permit the determination of operating compressor fluid pressures, compressor actuator means for actuating the compressing means, drive means for driving the compressor actuator means, selectively operable compressor drive control means for controlling the operation of the compressor drive means, the discharge means of the compressor being connected in fluid communication with the inlet means of a refrigerant fluid condenser means for condensing the fluid being discharged from the compressor; the condenser means including heat dissipation means for assisting in reducing the heat of the refrigerant fluid delivered thereto, condenser blower means to continuously move air over the heat dissipation means, drive means for operating the condenser blower, selectively operable control means for shutting off the condenser blower means to simulate a breakdown thereof, condenser outlet means connected in fluid communication with the inlet of the refrigerant evaporator means to return refrigerant fluid thereto; and selectively operable control means for controlling the operation of the air conditioning simulator.

References Cited

UNITED STATES PATENTS

| | | | |
|---|---|---|---|
| 1,547,091 | 7/1925 | Baxter | 35—49 |
| 2,761,293 | 9/1956 | Eubank | 62—504 X |

WILLIAM H. GRIEB, Primary Examiner

U.S. Cl. X.R.

62—531

UNITED STATES PATENT OFFICE
CERTIFICATE OF CORRECTION

Patent No. 3,526,044                        September 1, 1970

Boyce H. Dwiggins

It is certified that error appears in the above identified patent and that said Letters Patent are hereby corrected as shown below:

Column 5, line 37, "83" should read -- 84 --.

Signed and sealed this 16th day of March 1971.

(SEAL)
Attest:

Edward M. Fletcher, Jr.                      WILLIAM E. SCHUYLER, JR.
Attesting Officer                              Commissioner of Patents